United States Patent [19]

Boyd et al.

[11] 3,958,224

[45] May 18, 1976

[54] SYSTEM FOR UNATTENDED PRINTING

[75] Inventors: William Weller Boyd; Wayne Finis Rogers; James Wilson Toups, all of Austin, Tex.

[73] Assignee: International Business Machines Corporation, Armonk, N.Y.

[22] Filed: Dec. 26, 1973

[21] Appl. No.: 428,273

[52] U.S. Cl. .................. 340/172.5; 197/19

[51] Int. Cl.² .................. G06F 3/10

[58] Field of Search .................. 340/172.5; 197/19; 445/1

[56] References Cited

UNITED STATES PATENTS

| | | | |
|---|---|---|---|
| 3,248,705 | 4/1966 | Dammann et al. | 340/172.5 |
| 3,297,124 | 1/1967 | Sims | 197/19 |
| 3,490,004 | 1/1970 | Ross | 340/172.5 |
| 3,544,967 | 12/1970 | Sallach et al. | 340/172.5 |
| 3,648,251 | 3/1972 | Serracchioli et al. | 340/172.5 |
| 3,668,654 | 6/1972 | Doersam, Jr. | 340/172.5 |

OTHER PUBLICATIONS

IBM Tech. Disclosure Bulletin, Vol. 13, No. 12, May 1971, p. 3666, by Hollaway et al.

IBM Tech. Dis. Bulletin, Vol. 14, No. 7, Dec. 1971, p. 2105, Preparing Media for Unattended Printing, by Rogers.

*Primary Examiner*—Gareth D. Shaw
*Assistant Examiner*—John P. Vandenburg
*Attorney, Agent, or Firm*—John L. Jackson

[57] ABSTRACT

An unattended printing system in which the operator keys in a page line count defining the number of lines to be printed on a page from codes derived from a shift register memory which is automatically loaded from a pack feed magnetic read/recorder. Logic is provided which, in the event that the text being played out does not equal a full page, automatic indexes or carrier returns will be generated to cause the page to be fed such that the printing mechanism is then in alignment with the first line of the next page. While page feeding occurs the memory is also automatically cleared; a new card is fed and reading of new codes into the shift register initiated. In addition, in the event that the margins on the machine which is being used for playout differ from the margins which were used during source recording, in the event that a fewer number of lines of text result, the proper number of indexes for this fewer number of lines to cause proper alignment on the next page will be output. Further, in the event that the margins are changed such that the lines being printed out on the printer are shorter than those originally recorded, proper indexing for this greater number of lines to place the following page in proper alignment will be output provided that the total lines of text output do not exceed the page count entered. In the normal case line endings will have been determined and the margins will not be changed to prevent possible systems stoppage for hyphenation decisions.

18 Claims, 7 Drawing Figures

SYSTEM FOR UNATTENDED PRINTING

CROSS-REFERENCE TO RELATED APPLICATIONS

Margin Adjusting of Textual Codes in a Memory by W. W. Boyd, et al, filed July 15, 1975, Ser. No. 595,637, which is a continuation of application Ser. No. 428,274, filed Dec. 26, 2973, now abandoned, assigned to the assignee of the present invention and hereby incorporated by reference. The internal adjust logic described in this application provides a signal necessary for the operation of the unattended printing system which is the subject of the present invention.

Determination and Printout of Reference Line by W. W. Boyd, filed Dec. 26, 1973, Ser. No. 428,271, assigned to the assignee of the present application and hereby incorporated by reference. In this application there is taught a system for scanning text in a buffer in a no print mode in which the operator enters a line count and when that number of lines have been scanned, a reference print of the last line will occur. However, for ascetic layout purposes the system is automatically controlled such that the reference line will neither be the next to last line of a paragraph or the first line of a new paragraph.

BACKGROUND OF THE INVENTION

1. Field of the Invention

This invention relates to automatic printing systems in general, and more particularly to an unattended printing system which automatically prints pages in accordance with an operator entered line count and in the event that there is not enough text to fill a page, automatically indexes the page to be beginning of the next page to align the first line of the next page for an unattached printing operation.

2. Description of the Prior Art

In the context that unattended printing is used in the present application, there has been no true unattended printing system in the prior art. That is, in the prior art systems that unattended printing was usually that of fixed format letters and the format itself was relatively invariable. That is, unattended printing applications were generally limited to printing a form letter over and over and with the only variation in the unattended printing being the change in the name and address of, for instance, an addressee. To change the letter or format, operator intervention was required. That is, in the prior art unattended printing systems such as with a Magnetic Tape "Selectric" Typewriter carriage returns would have to be recorded on the magnetic media itself to cause indexing of the paper to be beginning of the new line on the next page. Thus, the operator would have to record the letter initially and determine how many carriage returns would be required to cause proper indexing for each of the letters. This process of prior recording was obviously relatively unwieldy and time consuming. In addition, if the margins on the machine which was being used for playout were changed such that more or less lines of text per page resulted, the recording of carrier returns based upon a different line length would cause inaccurate indexing of the paper. Thus, ideally a system was needed in which the operator could initially record a document with any line length and the printing system could accept this recorded text and provide accurate indexing at another line length and automatically cause the pages to be properly indexed in accordance with this new line length without any type of operator intervention.

SUMMARY OF THE INVENTION

In the IBM Mag Card II system there is a capability of reading a card which is initiated by depressing a read key, facilities for entering data into and clearing the shift register memory which includes primary and alternate sections, and for playing text from either memory section. The data flow in the system in the print mode is from a card read/recorder through a shift register memory to operate the printer. Data flow during a record operation is from the printer through the shift register memory and onto the magnetic card in the recording area of the read/record mechanism. The system includes a read/record mechanism which will hold fifty cards.

In the present unattended printing system, the above capabilities of the IBM Mag Card II will be utilized. Preparatory to initiating unattended printing, roll feed type paper is inserted in the printer with the paper positioned where the operator desires the first printed line to appear on the first page. The page count or the number of lines per page is entered into a storage register with the magnetic cards to be printed inserted into the hopper. This page count is solely a function of the size of a page, e.g., for 8½×11, 66 lines are available. However, if printing of the following page is not to begin at the first line of the page the page count may be increased by the operator. With the primary memory section addressed, depression of the code key and the auto secondary mode button initiates the unattended printing logic. Since the reading of a card requires much less time than printing, the card is stacked long before the playout of the cards is complete. The line end counter is incremented at the playout of each line ending character. Any stop codes incurred during unattended playout are ignored. Playout continues until either the end of text, a page end code is detected, or the page count is achieved. At this time the primary memory section is cleared and if the number of lines output is less than the stored page count, indexes are output and counted to cause the paper to be fed until the line end counter contents are equal to the stored page count. As the indexes are being output, the memory is cleared, the next card is fed and reading into the memory is initiated. When the output of indexes is terminated, the playout of the next card is initiated.

Text is always input on a page basis which implies that more than one card may be read per page. If the number of output lines is equal to or greater than the page count, the line end counter resets to zero when it equals the page count and continues to increment with the output of each line ending character.

Personalized form letters can be printed on the roll feed paper by using unattended printing. The body of the form letter is read into the primary memory section, and the variable information (e.g., names and addresses) is entered into the alternate memory section. Depending upon the placement of the switch codes, which cause switching back and fourth between the sections of memory, unattended playout may be initiated with either memory section addressed by the alternate section button. If it is desired to begin unattended playout by having the alternate section button addressing the primary memory section, playout will terminate when one card of variable information has been printed with the body of the form letter. However, if the alternate memory section is planned as the starting memory section, then up to fifty cards containing variable information may be printed with the body of the form letter. When the variables from a card have been printed, an end of text condition occurs in the memory section that the alternate section button is addressing. Thus, that section is automatically cleared and a new card of variables is read, no indexes are output at this time because these operations could occur in the middle of the body of the letter. The indexes are output after the execution of a repeat code which is at the end of the body of the letter. The above operations are automatically performed after the operator inserts the roll feed paper, positions the first page of paper to the first line position, places magnetic cards in the hopper of the read/recorder, keys the page count into the machine, and selects the proper memory section within which to locate the text.

DESCRIPTION OF THE PREFERRED EMBODIMENT

Figure 1:
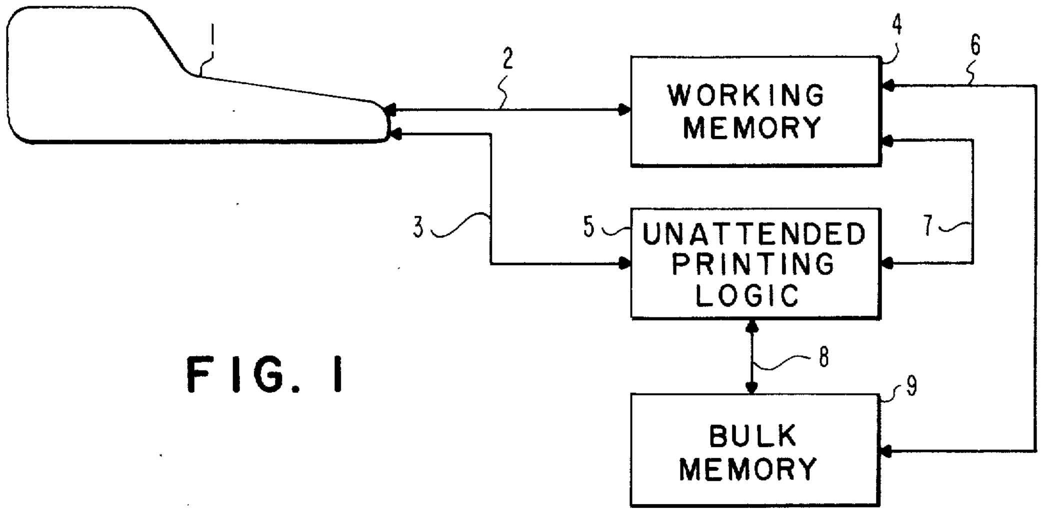
FIG. 1 is an overall pictorial representation of an unattended printing system.

For a more detailed description of the invention, refer first to FIG. 1 wherein there is shown an overall generalized block diagram of the system. As shown in FIG. 1, a printerkeyboard 1 is in two way communication along line 2 with a working memory 4. The working memory 4 is likewise in two way communication along line 6 with a bulk memory 9 and along line 7 in two way communication with the unattended printing logic 5. The bulk memory likewise is in two way communication along line 8 with the unattended printing logic 5. Finally, the unattended printing logic 5 is in two way communication with the keyboard printer 1 along line 3.

While in the preferred embodiment, the IBM Mag Card II will be utilized as the host system, and thus there will be a description of a mag card packfeed in two way communication with a dynamic shift register, it will be obvious to those skilled in the art that the working memory 4 need not be a dynamic shift register and the bulk memory 9 need not be a pack of mag cards. That is, the working memory 4 may be any type of memory in which the data can be sequentially presented at a read out port for decoding and can in fact be a random access memory which is addressed in a sequential manner to present the output of the various memory locations in the memory output register. In addition, the bulk memory 9 need not be a stack of magnetic cards as is used in the IBM Mag Card II system, but instead may be any type of tape or disc type bulk memory.

Figure 2:
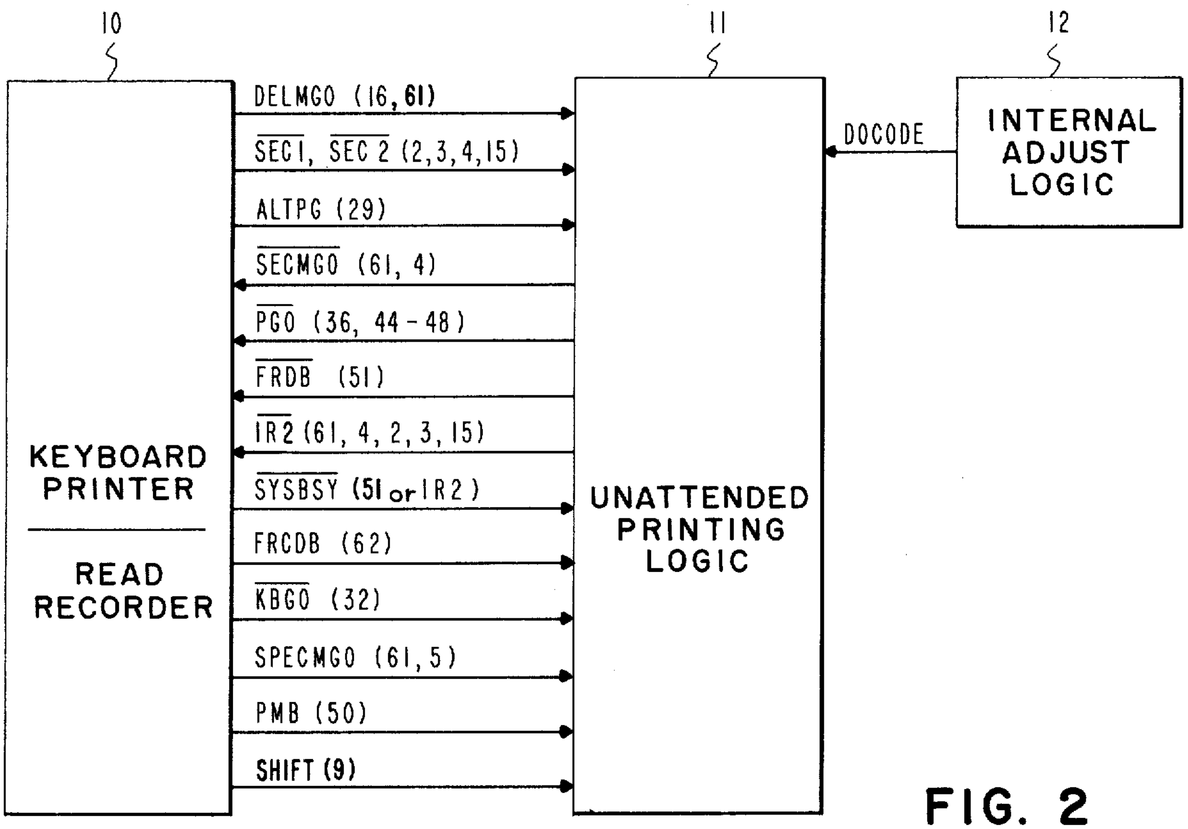
FIG. 2 is a diagram illustrating the cable connections between the Mag Card II keyboard printer read/recorder and the unattended printing logic illustrating which of the cable pins in the IBM Mag Card II furnish certain of the signals applied thereto by the unattended printing logic.

Referring next to FIG. 2 there is shown in block diagram form, a keyboard printer read/recorder (host system) 10 connected by a number of lines to the unattended printing logic 11 which is also connected along a DOCODE line to the internal adjust logic of the IBM Mag Card II system. The internal adjust logic of the IBM Mag Card II system is described in the aforementioned cross-referenced application, entitled, "Internal Adjust with Page Buffer", assigned to the same assignee of the present application and having a common filing date. The significance of FIG. 2 is that it shows various signals on the interface lines which may be applied from the keyboard printer 10 to the unattended printing logic 11 and signals from the unattended printing logic (DOCODE from latch 81 of the aforementioned Internal Adjust application) which are generated by it which are in turn applied to the keyboard printer/read/recorder and logic contained therein. These signals are also utilized in the detailed description of the unattended printing logic. Shown associated with these signals are pin numbers which can be utilized to connect the keyboard printer and read/recorder to the unattended printing logic. These pin numbers are identified and tied into associated schematic diagrams of the IBM Mag Card II I/O typewriter and read/recorder at pages 137 through 139 of the IBM Office Products Division, Customer Engineering Pictorial Reference/Adjustment Manual for the IBM Mag Card II Typewriter, Form No. 241-5583-3 (Revised) June, 1973. Thus, these pins and associated cable connections are identified and illustrate where the various signals may be derived from and may be applied thereto. It will, of course, be recognized by those skilled in the art that the signals to the unattended printing logic and from the unattended logic must be adjusted in such a manner that the appropriate voltages are applied to the respective units. Also, it will be recognized by those skilled in the art that to generate a pulse based on the signals appearing on a line, a single shot may be required. Prior to a detailed description of the unattended printing logic, a glossary of terms identifying various signals used in the detailed description will be given.

| GLOSSARY OF TERMS | |
|---|---|
| DELMGO | A pulse from the keyboard which indicates that a coded secondary mode key (character, word, line, or auto) has been depressed |
| $\overline{SEC1}$, $\overline{SEC2}$ | lines from a decode (not shown) which indicated which of the secondary mode keys or access mode keys has been depressed |
| ALTPG | a line from the keyboard which monitors the alternate section button to determine whether it is depressed |
| $\overline{SECMGO}$ | a line to the read/recorder which when driven by the unattended printing control logic will initiate unattended printing |
| $\overline{SMRST}$ | a pulse from the keyboard read/recorder which indicates that a commanded operation has terminated |
| $\overline{PGO}$ | a line from the unattended printing logic which when pulsed will cause the printer to print the character whose bit pattern is on the data buss |
| $\overline{DB1}$-$\overline{DB7}$ | seven data buss lines to the keyboard printer read/recorder used for outputting to the printer |
| $\overline{FRDB}$ | a line to the keyboard printer read/recorder logic will cause the read/recorder to read a card |

-continued

GLOSSARY OF TERMS

| | |
|---|---|
| $\overline{D1}$-$\overline{D5}$ | five information lines from the decode connected to the dynamic shift register which provide control codes for systems operation |
| $\overline{IR2}$ | a line into the keyboard printer read/recorder which when driven will result in the complete use of the resources of the keyboard printer read/recorder. This line can only be driven when the keyboard printer read/recorder is not otherwise busy. |
| $\overline{SYSBSY}$ | a line from the keyboard printer read/recorder which indicates whether or not it is busy |
| DOCODE | a line from the internal adjust logic which defines the time during which a character is being output |
| $\overline{FRCDB}$ | a line from the keyboard printer read/recorder which indicates that there is a card read error |
| $\overline{KBGO}$ | a pulse from the keyboard printer read/recorder which defines when a keyboarded character's bit pattern is on the data buss |
| SPECMGO | a pulse from the keyboard printer read/recorder that indicates a coded access mode button has been depressed |
| PMB | a line from the keyboard printer read/recorder which monitors the TPWR (typewriter) button. With this button depressed nothing keyed from the keyboard enters the memory and switch codes are honored when played |
| SHIFT | a signal from the keyboard which is generated while the printer is in the upper case mode |

The above interface lines are identified in FIGS. 4 – 7 by an (I) following them.

Figure 3:
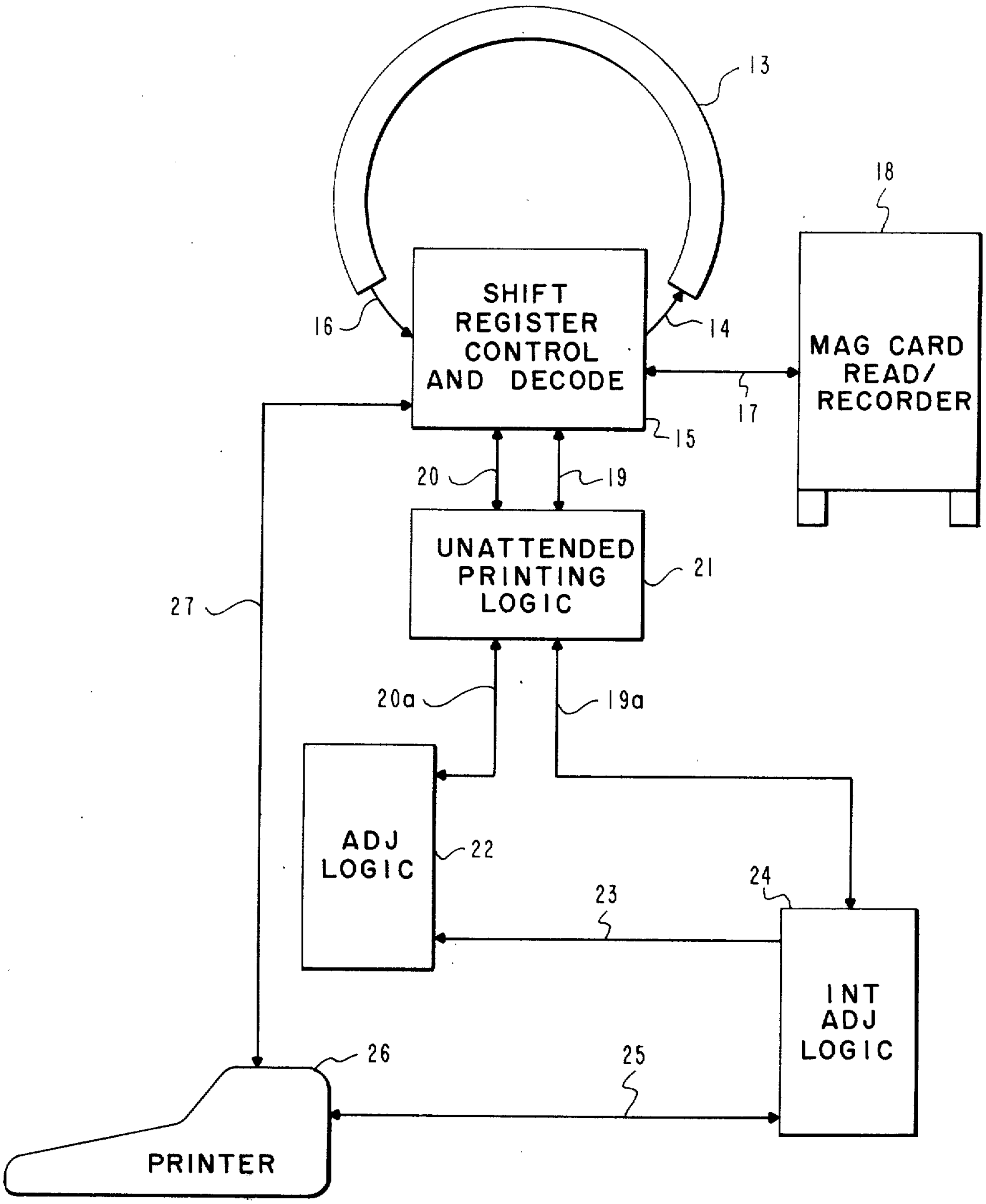
FIG. 3 is again an overall view illustrating the preferred embodiment of the subject unattended printing system in which a dynamic shift register is used as the working store as in the IBM Mag Card II.
Figure 4:
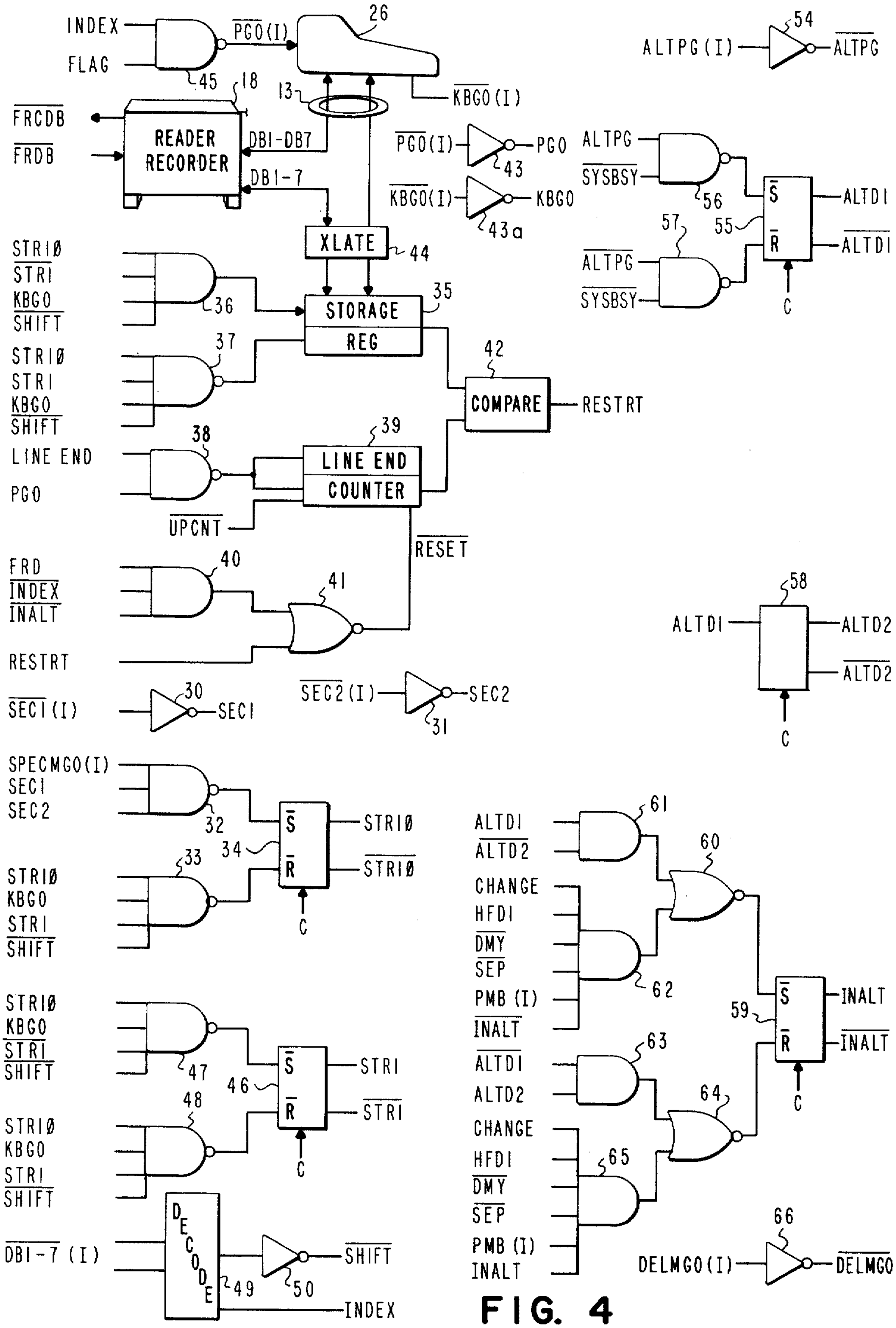
FIGS. 4 – 7 are drawings of the combinational logic implementation of the unattended printing control logic.
Figure 5:
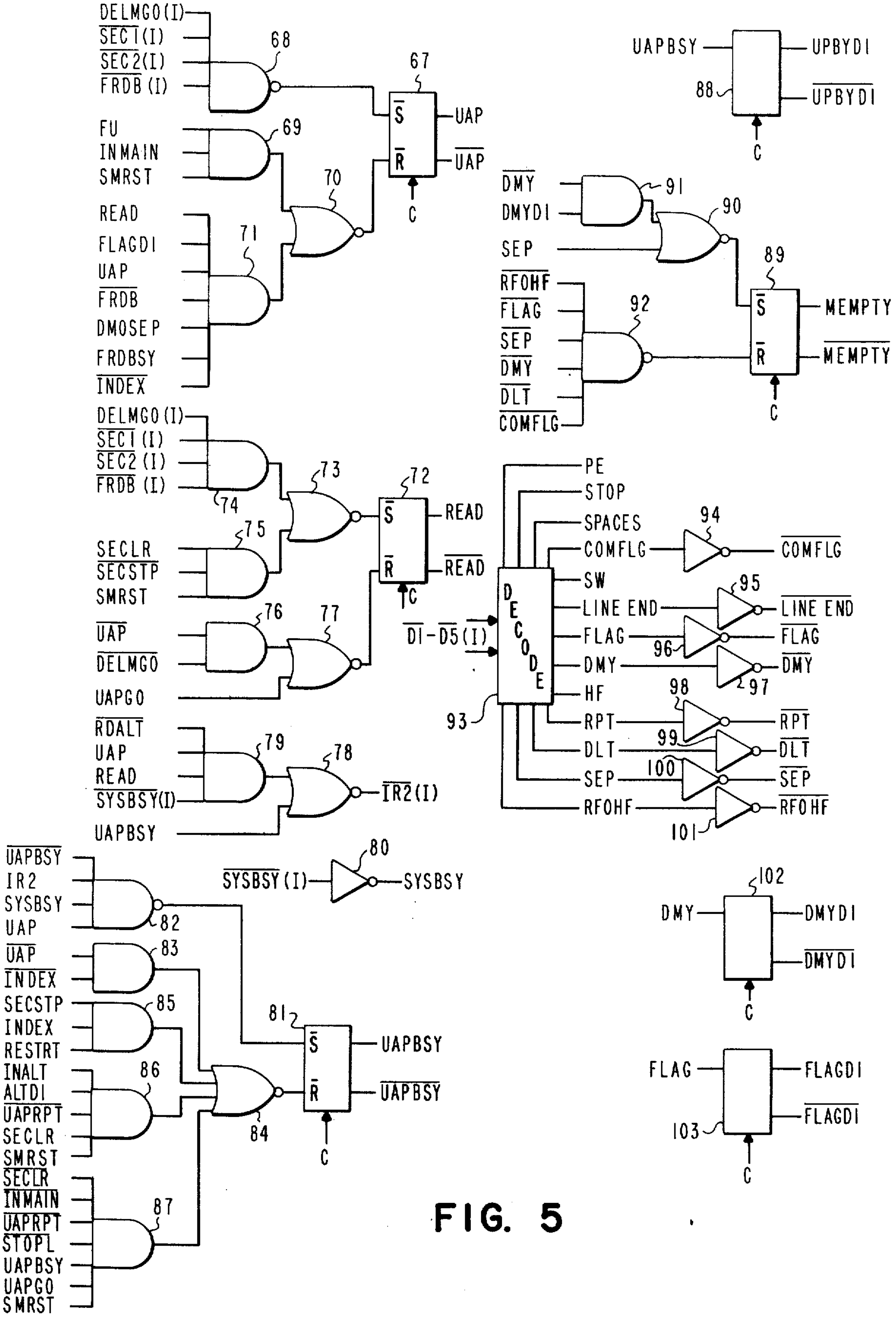
Figure 6:
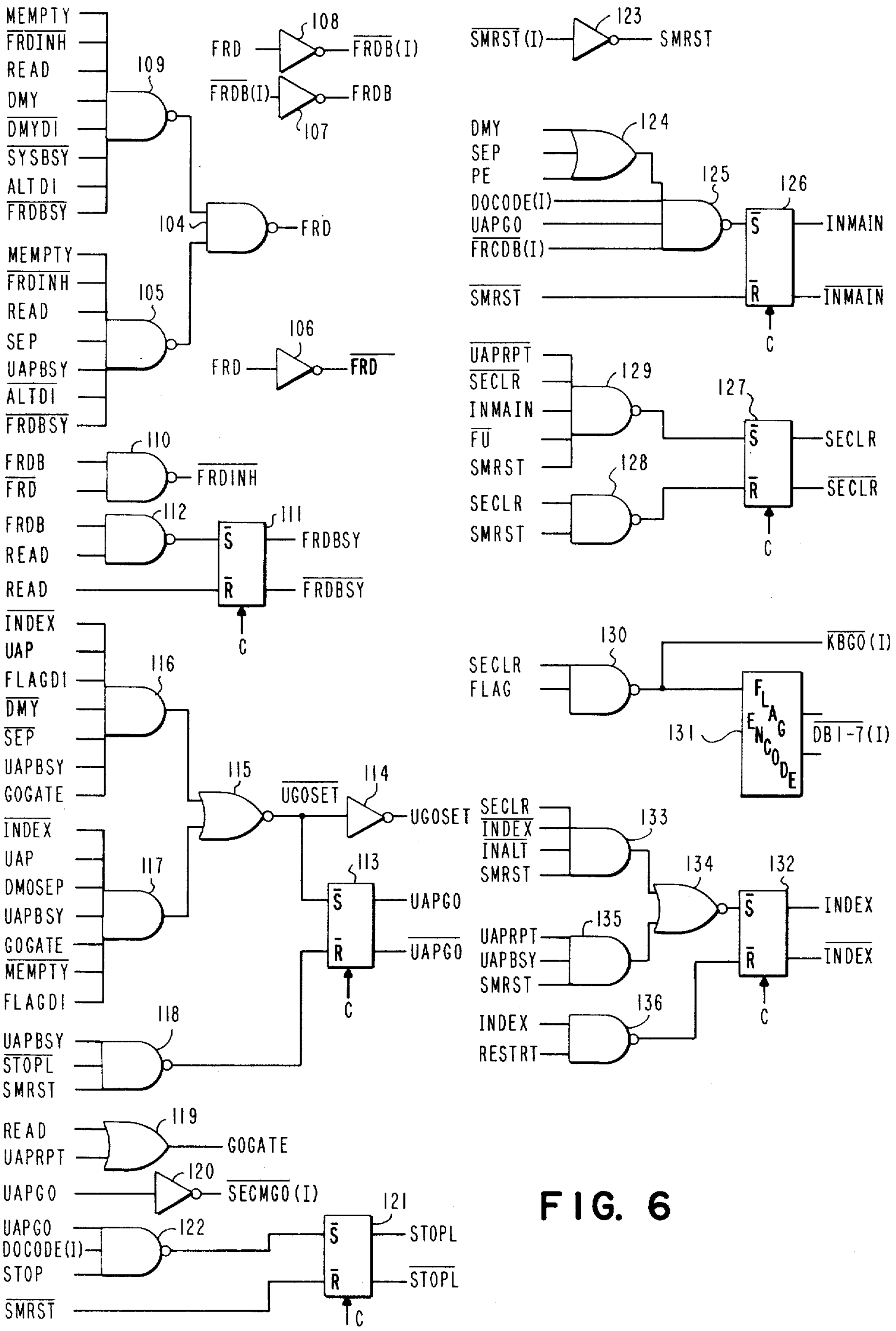
Figure 7:
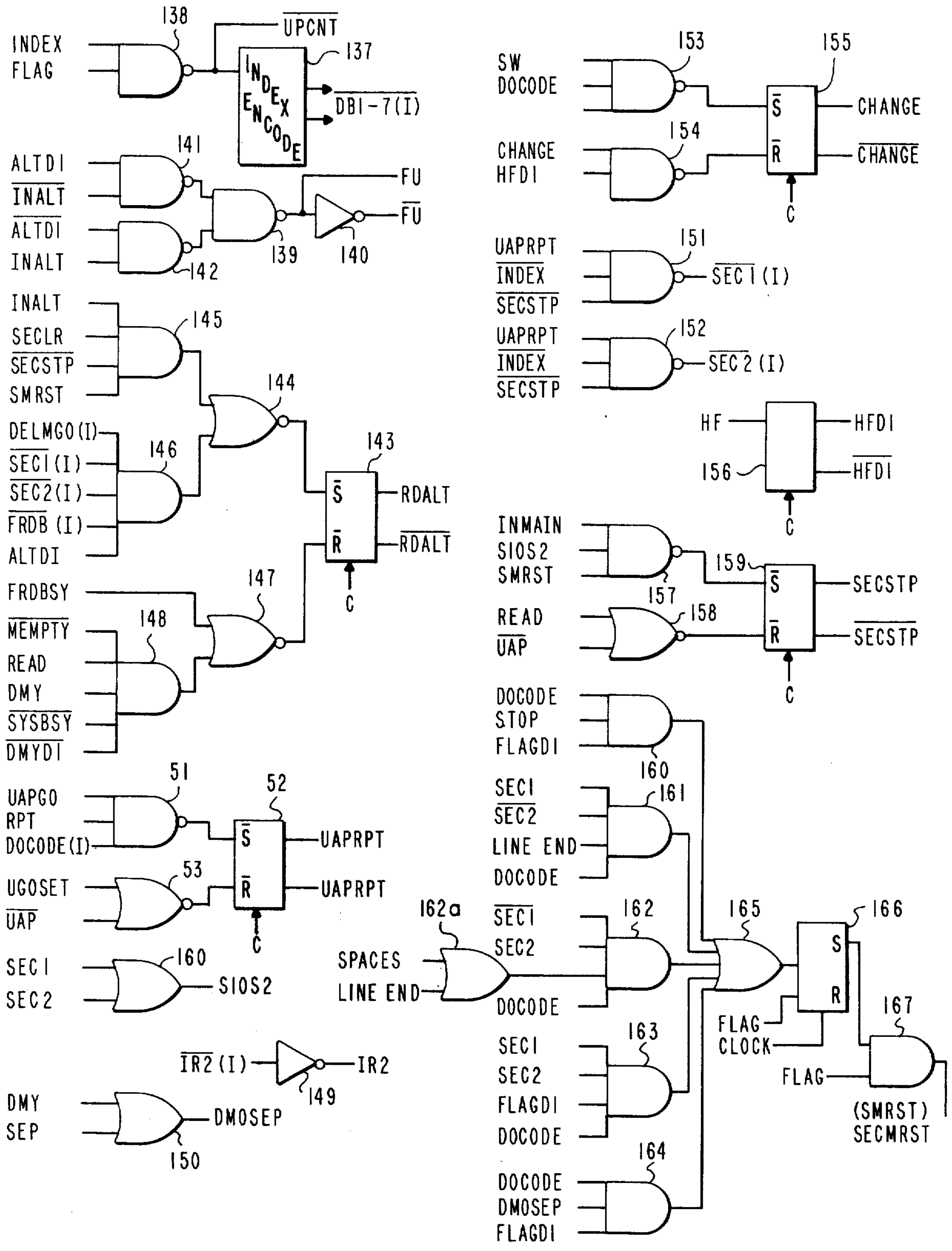

Refer next to FIG. 3 wherein is shown an overall block diagram of the IBM Mag Card II system. As shown there is an I/O device 26 which is a standard IBM printer/keyboard in two way communication along line 27 with a shift register and decode logic 15 which has circulating therethrough, the contents of the shift register 13. The output of the shift register 13 is along line 16 and into the shift register control and decode aand is taken along line 14 out of the shift register and decode back into the shift register 13. These seven bit characters which continuously circulate around in the shift register identify alphanumeric characters as well as control flags which are used for various control purposes as defined in U.S. Pat. No. 3,675,216, entitled "No Clock Shift Register and Control Technique", having Randell L. James as inventor. In addition, other control codes as will later be described are utilized to separate the shift register memory into alternate sections to allow switching of the read-out or read-in into or out of the memory into alternate sections. An additional description of the logical control of the shift register is given in "Alignment of Textual Character Fields", Ser. No. 427,616, having D. W. Cooper, et al, as inventors and "Centering of Textual Character Fields about a Point", Ser. No. 428,542, having D. W. Cooper, et al, as inventors, assigned to the same assignee of the present invention and hereby incorporated by the reference. The shift register is loaded along line 17 from the mag card read/recorder 18, which is a packfeed device which accommodates fifty cards. The shift register control and decode which provides the alphanumeric characters, as well as the control flags, is in two way communication along line 20 with the unattended printing logic 21 and along line 19 to the unattended printing logic 21. The unattended printing logic likewise is in two way communication along line 20*a* with the adjust logic 22 and along line 19*a* with the internal adjust logic 24. The internal adjust logic 24 is connected along line 23 to the adjust logic 22 and the internal adjust logic is also in two way communication along line 25 with the keyboard printer 26.

For purposes of the present invention, it is only necessary to know that control codes and alphanumeric characters are loaded into the shift register 13 from the mag card read/recorder and are recorded therefrom back onto which are in the mag card read/recorder. This reading of data from a card can be initiated by depressing a key on the printer or can be, as a result of a decode occurring in the shift register which indicates that more data is needed for printing. In an unattended mode of operation, as above discussed, a pinfeed platen which feeds a roll of paper sequentially past the printing line of a printer is inserted on the printer. A stack of cards is then loaded in the magnetic card read/recorder followed by reading from this stack of cards into the shift register with printing by the printer and indexing of the pages. The operator for unattended printing must first, however, key in the line count. Logic is provided, which, in the event that the text being played out does not equal a full page, generates automatic indexes or carrier returns to cause the pages to be fed such that the printer is in proper alignment with the first line of the next page. Further, in the event that the margins are changed, which is not the preferred mode of operation, on the machine which is being used for playout from the margins which were used for the recording machine, in the event that a fewer number of lines of text are recorded, the proper number of indexes for this fewer number of lines to cause proper alignment with the next page will be output. In addition, in the event that the margins are changed such that the lines being printed out on the printer are shorter than those originally recorded, proper indexing for the resultant greater number of lines to place the following page in proper alignment will be output provided that the total lines of text output do not exceed the page count entered.

Next a detailed description of the unattending printing logic, which allows this automatic unattending printing, will be described.

For purposes of clarity since the SMRST signal, which is applied to an interface line, was not identified with respect to the cable pins, and since it is utilized in the unattended printing logic, a description of the development of this signal will be given. For this description, refer to FIG. 7 wherein an OR gate 165 is shown as being driven by AND gates 160, 161, 162, 163, and 164. These AND gates have various inputs as identified. These various inputs will be later discussed. Suffice it to say that should any of the AND gates come true, OR gate 165 will set latch 166. Latch 166 is reset by detection of an operating flag occurring in the decode portion of the shift register, which again will later be discussed in detail. Setting of this latch 166 coupled with the detection of a flag by AND gate 167 generates the SMRST signal. The definition of this signal is that it is a pulse from the keyboard printer read/recorder which indicates that a commanded operation has terminated. Thus the various inputs, such as DOCODE, STOP, FLAG, AND gate 160, SEC1, SEC2, LINE END, DOCODE into AND gate 161, etc., comprise all the possible conditions which indicate that a particular commanded operation has been completed. These signals, as will later be described, may be derived from the internal adjust logic; from the shift register decode; and from monitoring the various functions of the printer itself by means of the cable pins.

Refer next to FIGS. 4 – 7 wherein is shown for purposes of clarity segments of the overall sequential logic which accomplishes the unattended printing. This logic is shown for purposes of clarity in unconnected form, but with each of the input lines to the various portions of the logic identified in a common manner throughout the four drawings, 4 – 7. It is felt that this type of presentation will be more clear than connecting each of the lines and having the numerous lines crisscrossing back and fourth over each other and running from page to page. Thus, the fragmental approach with individual lines always uniquely identified is taken.

To prepare for unattended printing, the operator must place paper into the printer portion of the keyboard 26 and insert magnetic cards to be played out into the read/recorder 18. Upon depressing the power on key, all latches are reset by the power on reset signal POR. Also as shown, all latches are set and reset by a low logical level. Next the page count must be entered into the machine. This is done by depressing the code key and the line return key on the keyboard printer portion of printer-keyboard 26. At this time, the unattended printing logic in a manner, later described, causes interface line SPECMGO to be driven. Simultaneously, interface lines $\overline{SEC1}$ and $\overline{SEC2}$ are driven low. They are decode signals which indicate which of the secondary mode keys or access mode keys was depressed. $\overline{SEC1}$ is inverted by inverter 30 to generate SEC1. $\overline{SEC2}$ is inverted by inverter 30 to generate SEC2. SECMGO, SEC1, and SEC2 are anded together by NAND gate 32 to set latch 34 to generate STR1$\phi$. At this time, the tens digit of the page count can be entered. Any key on the typewriter portion of the printer-keyboard 26 can now be hit. When any key is struck, interface line $\overline{KBGO}$ is driven, and the bit pattern for that particular key is put on data buss $\overline{DB1}$ through $\overline{DB7}$. Only numerics will be accepted into the storage register 35. The striking of any key on the keyboard other than a numeric will be translated by translator 44 into a zero. The only exception is the letter *l* which is translated to the numeral one. Thus, the keying of a numeral on the typewriter portion of the printer-keyboard 26 will drive interface line $\overline{KBGO}$ down and put the bit pattern for the numeral on the data buss. It is then converted from the seven bit binary tilt rotate code of the keyboard into a binary coded decimal form by translator 44. Meanwhile, interface signal $\overline{KBGO}$ is inverted through inverter 43*a* to generate KBGO. SHIFT, and INDEX signals are obtained from decoder 49 with inverter 50 providing the $\overline{SHIFT}$ signal. Since STR1$\phi$ is up and STR1 is not up, KBGO with $\overline{SHIFT}$ is anded through AND gate 36 to gate the translated bit pattern of the numeral into the tens portion of the storage register 35, which actually has two parts, one for the tens digit of the page count and one for the units digit of the page count. Simultaneously, the STR1 latch 46 is set through NAND gate 47 by STR1$\phi$, KBGO, $\overline{STR1}$, and $\overline{SHIFT}$. At this time the ones digit of the page count may now be entered. Another numeral is keyed from keyboard portion of printer-keyboard 26 driving interface line $\overline{KBGO}$ low and putting the bit pattern for the numeral on the data buss which is translated by translator 44. At this time the ones digit is gated into the storage register 35 by AND gate 37 whose inputs are STR10, STR1, KBGO, and $\overline{SHIFT}$. On the next clock cycle, the STR1$\phi$ latch 34 and the STR1 latch 46 are reset respectively through NAND gate 33 and NAND gate 48, respectively.

The depression of the shift key on the keyboard portion of the printer-keyboard 26 also generates a KBGO and the bit patterns for both lower and upper case shift can get on the data buss and will be translated to zero. However, shift codes cannot be allowed to enter zeros into the storage register because in some World Trade countries the numeric characters are in upper case. Thus, as above briefly described, off the data buss, $\overline{DB1}$ through $\overline{DB7}$ there is a decode, 49, that generates SHIFT which is inverted through inverter 50. This $\overline{SHIFT}$ signal acts as an inhibit on NAND gates 33, 47, and 48. It also acts as an inhibit on AND gates 36 and 37. The net effect is that all shift codes are totally ignored. With the page count successfully stored in the machine, unattended printing may now be initiated.

First an operation with the primary memory section being addressed will be described. In this case, the alternate section button is not depressed. Therefore, interface line ALTPG is not up, and this condition is inverted by inverter 54 generating $\overline{ALTPG}$. This guarantees that when the system is not busy, that latch ATLD1, 55, is set. This guarantees that delay, ALTD2, 58, will not be up. Also since nothing has been done to affect the state of the INALT latch, 59, it will be off or still reset.

To initiate unattended printing, the code key is depressed along with the "Auto" button. At this time, interface signal DELMGO is pulsed from the host system. The signal is inverted through inverter 66 to generate $\overline{DELMGO}$. Knowledge that the Auto button has been depressed can be gained from interface lines $\overline{SEC1}$ and $\overline{SEC2}$. These lines are not driven when the auto button is depressed. Thus, the UAP latch, 67, is set by NAND gate 68, whose inputs are DELMGO, $\overline{SEC1}$, $\overline{SEC2}$, and $\overline{FRDB}$, the generation of which will be described in connection with FIG. 6. The READ latch, 72, is set through NOR gate 73 and AND gate 74 whose inputs are DELMGO, $\overline{SEC1}$, $\overline{SEC2}$, and $\overline{FRDB}$. With the UAP latch, 67, and the READ latch, 72, set, the interface line $\overline{IR2}$ is driven through NOR gate 78 and AND gate 79 whose inputs are $\overline{RDALT}$, UAP, READ, and $\overline{SYSBSY}$. At this point, the system is not busy and thus, interface line $\overline{SYSBSY}$ is up, which is inverted through inverter 80 to generate SYSBSY. One bit time later, $\overline{SYSBSY}$ is driven by the keyboard printer read/recorder. Thus interface line $\overline{IR2}$ is inhibited from being driven. However, if the system accepts the interrupt request, the $\overline{IR2}$ line will be driven from the host system the next bit time. Assuming this is the case, the latch UAPBSY, 81, will set through NAND gate 82 whose inputs are $\overline{UAPBSY}$, IR2, SYSBSY, and UAP. Also, delay UPBYD1, 88, will also set the next bit time. At this time, the read/recorder 18 will not be told to read if the memory is not empty. Thus, to obtain this information about the memory, a MEMPTY latch 89 is utilized. This latch is set when the end of either memory section is detected. This is accomplished through NOR gate 90 and AND gate 91. The SEP input to NOR gate 90 is the end of the primary memory section. The $\overline{DMY}$, DMYD1 inputs to AND gate 91 is the detection of the end of the alternate memory section. The MEMPTY latch 89 is reset by NAND gate 92 whenever any code other than a record flag, holding flag, a flag, a separator, a dummy, a delete, or a communication flag is detected. These decodes are obtained from decode 93 whose input is the Decode buss $\overline{D1}$ through $\overline{D5}$, which all have the DSR memory.

From decode 93 comes the COMFLG decode which is inverted through inverter 94 to generate $\overline{COMFLG}$, the LINE END decode which is inverted through inverter 95 to generatae $\overline{LINE\ END}$, the FLAG decode which is inverted through inverter 96 to generate $\overline{FLAG}$; SPACE decode; the DMY decode is inverted through inverter 97 to generate $\overline{DMY}$; the RPT (Repeat) decode which is inverted through inverter 98 to generate $\overline{RPT}$; the DLT (Delete) decode which is inverted through inverter 99 to generate $\overline{DLT}$; the SEP (Separator) decode which is inverted through inverter 100 to generate $\overline{SEP}$; and the RFOHF (Record flag or holding flag) decode which is inverted to inverter 101 to generate $\overline{RFOHF}$. The DMY decode is delayed a bit time by delay DMYDL, 102. Also, the FLAG decode is delayed a bit time by the delay FLAGD1, 103. Since the primary memory section is being addressed, the signal ALTD1 will be down and $\overline{ALTD1}$ will be up. Thus, the first time the SEP code is decoded through decode 93, the signal FRD is driven through NAND gate 104 and NAND gate 105 whose inputs are MEMPTY, READ, SEP, UAPBSY, $\overline{ALTD1}$, $\overline{FRDBSY}$, and $\overline{FRDINH}$. $\overline{FRDINH}$ is driven from NAND gate 110 whose inputs are FRDB and $\overline{FRD}$. This logic is to assure that the line FRD will not be driven if the interface line $\overline{FRDB}$ is driven, and it is not the unattended printing feature driving it. FRD is inverted through inverter 106 to generate FRD which drives the interface line. Also, $\overline{FRDB}$, the interface line, is inverted through inverter 107 to generate FRDB. Driving of the interface line $\overline{FRDB}$ then tells the read/recorder 18 to read a card. At the same time, latch FRDBSY, 111, sets through NAND gate 112 whose inputs are FRDB and READ. The unattended printing of the card being read will not actually be initiated until the first character from the card is actually entered into the memory. This can be detected when the flag is addressing some other code than a dummy or separator. When this occurs, latch UAPGO, 113, will set through NOR gate 115 and AND gate 116 whose inputs are $\overline{INDEX}$, UAP, FLAGD1, $\overline{DMY}$, $\overline{SEP}$, UAPBSY, and GOGATE. GOGATE is generated through OR gate 119 whose inputs are READ and UAPRPT. UAPGO is then inverted through inverter 120 and drives interface line $\overline{SECMGO}$. Since at this time, interface lines $\overline{SEC1}$ and $\overline{SEC2}$ are not driven by the unattended printing control logic, the host system is instructed to do an Auto secondary mode. At this time, a character is read from the card into the memory and will begin to be printed on the printer portion of printer-keyboard 26.

The reading of a card requires much less time than printing a card. Thus a card will be read and stacked long before the printer completes the printing of the text that was contained on that card. A bit time after UAPGO sets, the READ latch, 72, resets through NOR gate 77. A bit time later, latch FRDBSY, 111, resets because the READ latch has been reset. If a STOP code is incurred during the unattended printing, it will be decoded through decode 93. The STOP latch, 121, will set through NAND gate 122 whose inputs are UAPGO, the interface line, DOCODE, and STOP decode. When the host system executes a stop code, a secondary mode reset will always follow. At this time, the interface line, $\overline{SMRST}$ will be driven and inverted through inverter 123 to generate SMRST. Thus, the STOP latch, 121, will be reset. However the fact that the STOP latch was up at the time of the SMRST, UAPGO, 113, and UAPBSY, 81, will not reset through NAND gate 118, whose inputs are $\overline{UAPBSY}$, STOP, and SMRST and AND gate 87, whose inputs are $\overline{SECLR}$, $\overline{INMAIN}$, $\overline{URPRPT}$, $\overline{STOPL}$, UAPBSY, UAPGO, and SMRST, respectively. However, the depression of a lower ordered secondary mode button line line, word, or character would also generate a SMRST which would, in fact, reset UAPGO, 113, and UAPBSY, 81. At this time the $\overline{IR2}$ line would cease to be driven by UAPBSY through NOR gate 78. The host system would release $\overline{SYSBSY}$, and the host system would be free for the operator's use.

Unattended printing will continue until a DMY, SEP, or a PGEND code is detected, all of which come from decode 93. The DMY, SEP, and PGEND decodes are ORED together through OR gate 124 and anded through NAND gate 125 with DECODE, UAPGO, and $\overline{FRCDB}$ to set the INMAIN latch, 126. The host system will always generate a SMRST after the detection of a DMY, SEP, or PGEND. At that SMRST the SECLR latch, 127, will set through NAND gate 129 whose inputs are $\overline{UAPRPT}$, $\overline{SECLR}$, INMAIN, $\overline{FU}$, and SMRST. With the SECLR latch up, the first time a FLAG appears from decode 93 it is anded with SECLR through NAND gate 130 into the FLAG encode 131. The bit pattern for FLAG is put on the data buss. $\overline{DB1}$ through $\overline{DB7}$, and $\overline{KBGO}$ interface line is driven. This action commands the host system to do a section clear by entering dummy codes into the section as described in the aforementioned James patent. When the section clear has been terminated, the host system or keyboard portion of read/recorder will generate SMRST. The SECLR latch, 127, will reset through NAND gate 128 whose inputs are SECLR, and SMRST. At this time, the INDEX latch, set will lset through NOR gate 134 and AND gate 133 whose inputs are SECLR, $\overline{INDEX}$, $\overline{INALT}$, and SMRST. Simultaneously, the READ latch, 72, will set through NOR gate 73 and AND gate 75 whose inputs are SECLR, $\overline{SECSTP}$, and SMRST. Since the memory has been cleared, the MEMPTY latch, 89, is set. Therefore, the appearance of the next SEP will drive FRD through NAND gate 104 and NAND gate 105 which will again cause the read/recorder to read the next card. Meanwhile with the INDEX latch 132 set, the reset of the line end counter through AND gate 40 and NOR gate 41 has been inhibited. However, with the INDEX latch 132 set, the next flag that occurs will cause an INDEX to be encoded on the data buss lines $\overline{DB1}$ through $\overline{DB7}$ through INDEX encode 137 and NAND gate 138. The outputs of NAND gate 138 is labeled $\overline{UPCNT}$. $\overline{UPCNT}$ goes to line end counter 39 which increments for every index encoded on the data buss. Each index is consequently output on the printer portion of the printer-keyboard through NAND gate 45 whose inputs are INDEX and FLAG. The output of NAND gate 45 is labeled $\overline{PGO}$, the interface line to the host system. Up to this time the line end counter 39 has been incremented by the actual output of a line end character, which has been generated by decode 93 and anded to PGO through NAND gate 38. The source of PGO is inversion of the interface line $\overline{PGO}$ through inverter 43. Thus, indexes are output until the contents of the line end counter and the contents of the storage register are equal to each other. When compare 42 comes true, a signal is generated called RESTRT. RESTRT resets the line end counter to zero through NOR gate 41 and resets the INDEX latch, 132, through NAND gate 136, whose inputs are INDEX and RESTRT. Therefore, with the INDEX latch reset and the READ latch still set, UAPGO 113 will set through NOR gate 115 and AND gate 116 at the next FLAGD1 time. Since the reading of a card has been overlapped with the output of indexes, there should be ample text in the memory to start printing, which is detected by AND gate 116 and sets UAPGO. At the previously mentioned FRDB time, the FRDBSY latch, 111, will reset because the READ latch reset. Now unattended printing continues, and the output of the second page is now being done because UAPGO again drives SECMGO interface line through inverter 120.

Unattended printing from the alternate section will now be described. Depressing the alternate section button drives interface line ALTPG (alternate page) high which is inverted to inverter 54. While the system is not busy at this time, the ALTD1 latch, 55, will be set through NAND gate 56 whose inputs are ALTPG and $\overline{SYSBSY}$. At this time the delay ALTD2, 58, will be set. Also, at this time, the INALT latch, 59, will be set through NOR gate 60 and AND gate 61 whose inputs are ALTD1 and $\overline{ALTD2}$. It will be noted at this time that the output of NAND gate 139, FU, is still down because neither NAND gate 141 nor 142 has been satisfied. Therefore, $\overline{FU}$, the output of inverter 140, is true. The purpose of this logic is to distinguish when the state of the alternate page button and the memory section from which output is being done are different. This situation can happen and will be described later. The initiation of unattended printing from the alternate section is initiated the same way as it is out of the primary section. That is, by depressing coded Auto. As in the former case, UAP latch, 67, and the READ latch, 72, will set. Also, the RDALT latch, 143, will set through NOR gate 144 and AND gate 146 whose inputs are DELMGO, $\overline{SEC1}$, $\overline{SEC2}$, $\overline{FRDB}$, and ALTD1. It will be noted at this time that the output of NOR gate 78, $\overline{IR2}$ will not be driven through AND gate 79 because RDALT latch is set inhibiting this activity. This is necessary since when outputting from the alternate section, unattended printing and the reading of a card cannot be overlapped. The end of the alternate section is determined by the combination of DMY and $\overline{DMYD1}$ and when this time occurs, FRD will be driven through NAND 104 and NAND gate 109 whose inputs are MEMPTY, $\overline{FRDINH}$, READ, DMY, $\overline{DMYD1}$, $\overline{SYSBSY}$, ALTD1, and FRDBSY. AGain, the memory is assumed empty at this time. FRD is again inverted through inverter 108 to drive interface line $\overline{FRDB}$ which informs read/recorder 18 to read a card. FRDBSY latch, 111, will again set through NAND gate 112. A bit time after FRDBSY latch, 111, is set, the RDALT latch, 143, is reset through NOR gate 147. Simultaneously the host system drives interface line, $\overline{SYSBSY}$. Therefore, $\overline{IR2}$ line, which is driven from NOR gate 78 through AND gate 79, is still inhibited from being driven by the fact that SYSBSY is now up even though RDALT latch is now down. The host system will continue to drive the $\overline{SYSBSY}$ line, the interface line, down until the read/recorder has terminated reading into the alternate section. The $\overline{SYSBSY}$ line, the interface line, has been released and the $\overline{IR2}$ line will be driven through NOR gate 78 and AND gate 79. At this next bit time, the host system drives interface line, $\overline{SYSBSY}$ again, which causes unattended printing logic to stop driving the interface line, $\overline{IR2}$. At the next bit time, the host system will drive the interface line $\overline{IR2}$ line, which is inverted through inverter 149 to generate IR2. Consequently, the UAPBSY latch, 81, will set through NAND gate 82 and UPBYD1, 88 will set a bit time later by UAPBSY. Since the text is already in the memory, the UAPGO latch, 113, will set through NOR gate 115 and AND gate 116. The signal UAPGO is then inverted through inverter 120 to drive interface line $\overline{SECMGO}$ which commands the host system to commence playout. From this point until a dummy, separator, or page end code is detected in the alternate section, the playout from the alternate section is exactly like the playout from the primary section. When one of these three codes is detected, the INMAIN latch, 126, will set through NAND gate 125 and OR gate 124. At the following SMRST the SECLR latch, 127, will set through NAND gate 129. The SMRST, which follows the section clear indicating that operation has been done, resets the SECLR latch, but it will be noted that the INDEX latch, 132, will not be set through NOR gate 134 and AND gate 133 because $\overline{INALT}$ is one of the terms on the AND gate. Thus, no indexes will be output when unattended printing comes from the alternate section. Also, at the SMRST resulting from the section clear, the UAPBSY latch, 81, will reset through NOR gate 84 and AND gate 86 whose inputs are INALT, ALTD1, $\overline{UAPRPT}$, SECLR, and SMRST. When this happens the $\overline{IR2}$ line will cease to be driven through NOR gate 78 by UAPBSY. A bit time later, the interface line $\overline{SYSBSY}$ will cease to be driven by the host system. Also at the SMRST resulting from the clearing of the memory, the RDALT latch 143, will set through NOR gate 144 and AND gate 145 whose inputs are INALT, SECLR, $\overline{SECSTP}$, and SMRST. Also, the READ latch, 72, will be set through NOR gate 73 and AND gate 75 whose inputs are SECLR, $\overline{SECSTP}$, and SMRST. Thus again the line FRD, through NAND gate 104 and NAND gate 109 will be driven, to tell the read/recorder by driving interface line $\overline{FRDB}$ down through inverter 108, to read the next card. A bit time later the host system drives interface line $\overline{SYSBSY}$ inhibiting unattended printing from driving $\overline{IR2}$ line through NOR gate 78 and AND gate 79. When the next card has been read, interface line $\overline{SYSBSY}$ will cease to be driven. At this time $\overline{IR2}$ will be driven again through AND gate 79 and NOR gate 78. This will last for a bit time because the host system will drive interface line $\overline{SYSBSY}$. Thus, when the host system also drives IR2 line back, UAPBSY 81 again sets with UPBYD1 88 following. Again, latch 113, UAPGO, will set resetting the READ latch, 72, through NOR gate 77, and a bit time later FRDBSY, 111, will also reset. This cycle will continue as long as there are cards in the read/recorder hopper or the operator stops it for some reason.

There can exist a situation in which text can already be in the alternate section. Thus, the MEMPTY latch will not be up. Upon initiating unattended printing, UAP latch, 67, the READ latch, 72, and the RDALT latch, 143, will all three set. Since the memory is not empty, the RDALT latch, 143, will reset through NOR gate 147 and AND gate 148 whose inputs are $\overline{MEMPTY}$, READ, DMY, $\overline{DMYD1}$, and $\overline{SYSBSY}$, which is actually the time condition that defines the end of the alternate memory section. Also, the line FRD is not driven through NAND gate 104 because there is no need to read the cards since there is text already in the alternate memory section. The $\overline{\text{IR2}}$ line is driven as before and the operation continues as before. The same condition can occur when unattended printing is being done from the primary memory section. This sequence of events is exactly the same as described when unattended printing from the primary section except that the FRD line, the output of NAND gate 104, is not driven. In that case text would already be in the primary memory sections. Also there is a situation which can occur in either memory section. The operating flag can be addressing the end of either section and there is text already in either section. The initiation of unattended printing in either section is the same as described for either section. In each case, the read/recorder will not be told to read because this special condition is uniquely determined by AND gate 117 which sets UAPGO latch, 133, through NOR gate 115. This condition is defined by the inputs on AND gate 117, $\overline{\text{INDEX}}$, UAP, UAPBSY, GOGATE, $\overline{\text{MEMPTY}}$, FLAG1 and DOMSEP.

The handling of a repeat code in the primary sections will now be described. The initialization of unattended printing, the reading of the card, the actual initiation of the printout remain the same. When a repeat code is encountered, the UAPRPT latch, 52, will set through NAND gate 51 whose inputs are UAPGO, RPT, and DOCODE. The RPT decode comes from decode 93. At this time the interface line $\overline{\text{SEC1}}$, and $\overline{\text{SEC2}}$ will be driven by NAND gates 151 and 152 respectively. The inputs to these NAND gates are UAPRPT, $\overline{\text{INDEX}}$, $\overline{\text{SECSTP}}$. This is done to command the host system to go into character mode. When the host system has performed the page repeat function that is moving the operational flag back to the front end of the memory section, then a SMRST will be generated from the host system. It will be noted at this time that the SECLR latch, 127, will not set through NAND gate 129 because UAPRPT is set. Therefore, as the SMRST is generated by the forcing of character mode the INDEX latch, 132, will set through NOR gate 134 and AND gate 135 whose inputs are UAPRPT, UAPBSY, and SMRST. Also the interface line $\overline{\text{SEC1}}$ and $\overline{\text{SEC2}}$ will cease to be driven through NAND gates 151 and 152, respectively. Also at this SMRST, the UAPGO latch, 113, will be reset through NAND gate 118. The output of the indexes are controlled as previously described, and, when compare 42 comes true, the RESTRT is generated which resets line counter through OR gate 41 and also resets the INDEX latch, 132, through NAND gate 136. Thus at the next FLAGD1 time, the UAPGO latch, 113, will set through NOR gate 115 and AND gate 116. Thus, the unattended printing of the repeat code job is again initiated. The UGOSET signal generated from inverter 114 then resets the UAPRPT latch, 52, through NOR gate 53. The handling of the repeat code when unattended printing is being done from the alternate memory section is the same as it is when it is being done from the primary memory section.

Within unattended printing there is some logic which keeps up with the section from which printing is being done at all times. This logic monitors this condition whether or not unattended printing is being utilized. Regardless of the section being utilized when a switch code is detected, the CHANGE latch, 155, will set through NAND gate 153 whose inputs are SW, DOCODE. The SW decode comes from decode 93. The holding flag is always in the other memory section. When the holding flat (HF) is decoded through decode 93, it is delayed a bit time through HGD1, 156. At this time the CHANGE latch, 155, will reset through NAND gate 154. At the HFD1 time, the INALT latch will then reflect any change that might take place in the memory section from which printing is occurring. The host system will only honor switch codes when the interface line PMB is high. With that line high, it will only honor switch codes if the holding flag which is always in the other memory section or the switched to memory section, is not addressing the end of that memory section. Thus under the stipulated on the INALT latch, 59, will either set or reset depending upon its previous state, it will either set through NOR gate 60 and AND gate 62 whose inputs are CHANGE, HFD1, $\overline{\text{DMY}}$, $\overline{\text{SEP}}$, PMB, $\overline{\text{INALT}}$, or will reset through NOR gate 64 and AND gate 65 whose inputs are CHANGE, HFD1, $\overline{\text{DMY}}$, $\overline{\text{SEP}}$, PMB and INALT. Therefore, there is a way that unattended printing can be started in a section which is not in agreement with the condition of the alternate section button. When this occurs, either the conditions on NAND gate 141 or 142 will be true and will be reflected through NAND gate 139 and will drive the signal FU high and the signal $\overline{\text{FU}}$ low through inverter 140. Therefore with unattended printing underway, under the stipulated conditions, and when the end of either section is detected, the INMAIN latch, 126, will set. At the following SMRST, the UAP latch, 67, will reset through NOR gate 70 and AND gate 69 whose inputs are FU, INMAIN and SMRST. Of course the UAPGO latch, 113, will reset through NAND gate 118 and the UAPBSY latch, 81, will reset through NOR gate 84 and AND gate 83 whose inputs are $\overline{\text{UAP}}$ and $\overline{\text{INDEX}}$. Thus, the $\overline{\text{IR2}}$ line will cease to be driven through NOR gate 78 by UAPBSY, and the host system will then stop driving $\overline{\text{SYSBSY}}$. Consequently the unattended printing mode is terminated.

Also, there exists the condition in unattended printing from either memory section that there are no cards in the hopper. In this case the initialization of unattended printing from either section goes as previously described for either section. The read/recorder will be given a command to read, and it will cycle in an attempt to feed and read a card. Since there are no cards in the read/recorder, no text will go in the memory, and the conditions to set UAPGO will never occur. Therefore, the READ latch, 72, will remain set; the FRDBSY latch, 111, will remain set and as soon as the read/recorder terminates its feed and read attempt, the interface line FRDB will cease to be driven. Thus this condition is detected, and the UAP latch 67 will reset through NOR gate 70 and AND gate 71 whose inputs are READ, FLAGD1, UAP, $\overline{\text{FRDB}}$, DMOSEP, FRDBSY and $\overline{\text{INDEX}}$. The READ latch, 72, will then be reset through NOR gate 77 and AND gate 76 whose inputs are $\overline{\text{UAP}}$ and $\overline{\text{DELMGO}}$. Also, UAPBSY latch, 81, will be reset through NOR gate 84 and AND gate 83 whose inputs are $\overline{\text{UAP}}$ and $\overline{\text{INDEX}}$.

The operation of unattended printing will be described when the last line to be printed does not end with a line ending code and the operator attempts to stop playout by hitting a lower ordered secondary mode key during the playout of this line. The case is easily seen by the depression of the line mode key. However, a case can be created by depression of the word mode key during the playout of the last word of this line or the character mode key during the playout of the last character of this line. In any of these cases, the INMAIN latch, 126, will set through NAND gate 125 and OR gate 124 when the end of the memory section or page end has been detected. The depression of any of these keys will drive from the host system, combinations of interface lines $\overline{SEC1}$ and $\overline{SEC2}$. A signal S10S2 is generated through OR gate 160 whose inputs are SEC1 and SEC2. At the following SMRST, the SECSTP latch 159, will set through NAND gate 157 whose inputs are INMAIN, S10S2, and SMRST. The SECLR latch, 127, will set through NAND gate 129 at the following SMRST resulting from the clearing of the memory section and the INDEX latch, 132, will set through NOR gate 134 and AND gate 133. However, the READ latch, 72, or the RDALT latch, 143, if printing is being done from the alternate section, will not set because SECSTP latch is up. When the indexes are being output and the compare 42 comes true, the RESTRT is generated which resets line end counter 39 and also resets UAPBSY latch, 81, through NOR gate 84 and AND gate 85 whose inputs are SECSTP, INDEX and RESTRT. Thus $\overline{IR2}$ line would cease to be driven through NOR gate 78 and the host system will subsequently drop interface line $\overline{SYSBSY}$. Thus the halt command will be honored, but will be honored only after the section is cleared and the indexes are output. The SECSTP latch then will be reset through NOR gate 158 whose inputs are READ and $\overline{UAP}$. These reset terms depict the cases where either unattended printing is reinitiated and the read latch sets or if the unattended printing mode is aborted.

In summary, in the preferred embodiment there has been provided an unattended printing system in which the operator keys in a page line count defining the total number of lines possible on a page. The first page is under operator control first line positioned by rotating the printer platen or depressing the carriage return button. This initial positioning determines the position of the first line on all subsequent pages. Lines are then printed on the pages from codes derived from a shift register memory which is automatically loaded from a packfeed magnetic read/recorder. Logic is provided which, in the event that the text being played out does not equal a full page, automatic indexes or carrier returns will be generated to cause the page to be fed such that the printing mechanism is then in alignment with the first line of the next page. In the preferred usages to eliminate possible hyphenation decisions, the margins on the unattended printer are set such that the previously determined line endings may be used on playout. However, in the event that the margins on the machine which is being used for playout differ from the margins which were used during source recording, and in the event that a fewer number of lines of text result, the proper number of indexes for this fewer number of lines to cause proper alignment on the next page will be output. Further, in the event that the margins are changed such that the lines being printed out on the printer are shorter than those originally recorded, proper indexing for this greater number of lines to place the following page in proper alignment will be output provided that the total lines of text output do not exceed the page line count entered. In both cases, this may not result in total unattended printing since possible systems stoppage for hyphenation decisions might occur. However, even if the margins were changed, good efficiencies could be obtained since a single operation could control several systems since she need only make the few hyhenation decisions which might be required per page. These occur in the IBM MAG Card II system only when the final word on a line completely spans a six character zone.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An unattended printing system for printing individual records on sheets of paper or other suitable media comprising:

- a printer;
- a bulk storage means containing said individual records including format code characters and alphanumeric code characters to be printed on said media;
- a sequentially addressable working memory interfaced with said bulk storage means for receiving said format code characters and said alphanumeric code characters of each individual record to be printed by said printer;
- control means connected to said working memory and said printer operative to control said printer to print the alphanumeric code characters stored in said working memory in accordance with the format codes stored therein;
- unattended printing logic connected to said working memory and said printer said unattended printing logic including,
- storage means for receiving and holding a representation of the maximum number of lines which make up a page of said media;
- a line end counter for counting line end code characters read from said working memory to accumulate a count of lines printed by said printer;
- a compare unit connected to said storage means and said line end counter for comparing the maximum line count in said storage means to the number of lines printed by said printer;
- logic means operative in response to end of alphanumeric code characters in said working memory for clearing said working memory of said format and alphanumeric code characters; and
- indexing means operative in response to the end of alphanumeric code characters in said working memory for outputting indexing pulses to said printer and said line end counter to cause said printer to advance the page of said media being printed upon out of printing association with said printer and advance a subsequent page into said printer until an equal compare output is indicated by said compare unit.

2. The unattended printing system of claim 1 wherein said unattended printing logic further includes,

- a decoder operative upon sensing a page end format code in said working memory to cause said logic means for clearing said working memory to clear said memory of said format and alpha numeric code characters, and
- said indexing means operative following the clearing of said working memory for outputting a sufficient number of index pulses to said printer to achieve said subsequent page alignment.

3. The unattended printing system of claim 1 wherein said unattended printing logic further includes, a decoder operative upon sensing an end of text code in said working memory to cause said logic means for clearing said memory to clear said memory of all of said format and alpha numeric code characters, and said indexing means operative following clearing said working memory for outputting a sufficient number of index pulses to said printer to achieve said subsequent page alignment.

4. The unattended printing system of claim 2 wherein said unattended printing logic further includes, means connected to said decoder and operative upon said decoder sensing that said working memory is empty or signalling said bulk storage means to transfer first and susequent records in a plurality of records into said working memory concurrently with the outputting of said index pulses to said printer; and restart means connected to said compare unit operative upon receipt of an equal compare signal to signal said printer to resume playout printing on said subsequent page.

5. The unattended printing system of claim 3 wherein said unattended printing logic further includes, means connected to said decoder and operative upon said decoder sensing that said working memory is empty for signalling said bulk storage means to transfer the next record in a plurality of records into said working memory concurrently with the outputting of said index pulses to said printer, and restart means connected to said compare unit operative upon receipt of an equal compare to inhibit said indexing means and signal said printer to resume playout printing on said subsequent page.

6. The unattended printing system of claim 1 wherein said unattended printing logic further includes, means for signalling said bulk storage means to read the next record in a plurality of records into said working memory concurrently with the outputting of said index pulses to said printer, and restart means connected to said compare unit operative upon receipt of an equal compare signal to enable said printer to resume playout printing on said subsequent page after all of said index pulses are output to said printer.

7. The unattended printing system of claim 4 wherein said bulk storage means is a magnetic card deck and said individual records are magnetic cards.

8. The unattended printing system of claim 5 wherein said bulk storage means is a magnetic card deck and said individual records are magnetic cards.

9. The unattended printing system of claim 6 wherein said bulk storage means is a magnetic card deck and said individual records are magnetic cards.

10. The unattended printing system of claim 1 wherein said unattended printing logic further includes, reset means connected to said compare unit operative to reset said line end counter to zero when the output of said compare unit indicates that the line end counter contents equals the maximum line count in said storage means.

11. The unattended printing system of claim 1 wherein said working memory includes, separator means defining primary and alternate sections thereof, and means for switching application of said characters applied to said printer back and forth between said sections upon the detection of switch code characters in each of said sections.

12. The unattended printing system of claim 11 wherein said individual records include variable information and non-variable information further including, means for reading said variable information into one of said sections of said working memory and said non-variable information is read into the other section of said working memory.

13. The unattended printing system of claim 12 wherein bulk storage means is a magnetic card deck and said individual records are magnetic cards.

14. The unattended printing system of claim 13 wherein, said logic means includes, a decoder operative upon sensing a page end code character in said working memory to cause said logic means for clearing said working memory to clear said working memory of all of said format and alpha numeric code characters, and said indexing means operative following the clearing of said working memory for outputting a sufficient number of index pulses to said printer to achieve said subsequent page alignment.

15. The unattended printing system of claim 13 wherein, said logic means includes a decoder operative upon sensing the end of text in said working memory to cause said logic means for clearing said working memory to clear said working memory of all of said format and alpha numeric code characters, and said indexing means is operative following clearing said working memory to output a sufficient number of index pulses to said printer to achieve said subsequent page alignment.

16. The unattended printing system of claim 13 wherein, said logic means is operative when the contents of said line end counter equals the number of lines entered in said storage means to clear said working memory of all of said format and alpha numeric code characters, and said indexing means is operative following clearing of said memory for outputting a sufficient number of index pulses to said printer to achieve said subsequent page alignment.

17. The unattended printing system of claim 13 wherein the margins of said printer are set such that the number of line end code characters contained in said working memory correspond to the carrier returns made by said printer during printout.

18. An unattended printing system for printing individual records on sheets of paper or other suitable media comprising:

a printer;

a bulk storage means containing a plurality of said individual records including format code characters and alphanumeric code characters to be printed on said media;

a sequentially addressable working memory interfaced with said bulk storage means for receiving said format code characters and said alphanumeric code characters of each individual record to be printed by said printer;

control means connected to said working memory and said printer operative to control said printer to print the alphanumeric code characters stored in said working memory in accordance with the format codes stored therein;

unattended printing logic connected to said working memory and said printer said unattended printing logic including, storage means for receiving and holding a representation of the maximum number of lines which make up a page of said media;

a decoder for sensing control codes stored in said working memory;

a line end counter connected to said decode and incremented by the sensing of line end code characters in said working memory to accumulate a count of lines printed by said printer;

a compare unit connected to said storage means and said line end counter for comparing the maximum line count in said storage means to the number of lines printed by said printer;

logic means connected to said decoder operative in response to an end of text code for clearing said working memory of said format and alphanumeric code characters;

indexing means connected to said decoder operative in response to a memory clear code for outputting indexing pulses to said printer and said line end counter to cause said printer to advance the page of media being printed upon out of printing association with said printer and to advance a subsequent page into printing alignment with said printer;

read signal generating means connected to said decoder and responsive to a memory clear code for signalling said working memory to read the next record from bulk storage means; and restart means connected to said compare unit operative upon an equal compare to enable said printer to resume playout printing on said subsequent page.

* * * * *